(12) United States Patent
Lee et al.

(10) Patent No.: US 8,463,136 B2
(45) Date of Patent: Jun. 11, 2013

(54) BURST MODE OPTICAL REPEATER

(75) Inventors: Mun-seob Lee, Daejeon-si (KR);
Byung-tak Lee, Gyeonggi-do (KR);
Jong-deog Kim, Jeollanam-do (KR);
Bin-yeong Yoon, Daejeon-si (KR);
Dong-soo Lee, Gwangju-si (KR);
Jai-sang Koh, Gwangju-si (KR); Hark Yoo, Gwangju-si (KR)

(73) Assignee: Electronics and Telecommunications Research Institute (KR)

( * ) Notice: Subject to any disclaimer, the term of this patent is extended or adjusted under 35 U.S.C. 154(b) by 771 days.

(21) Appl. No.: 12/572,148

(22) Filed: Oct. 1, 2009

(65) Prior Publication Data

US 2010/0135665 A1  Jun. 3, 2010

(30) Foreign Application Priority Data

Nov. 28, 2008 (KR) ................. 10-2008-0120120

(51) Int. Cl.
*H04B 10/16* (2006.01)
*H04B 10/29* (2006.01)

(52) U.S. Cl.
CPC ................................ *H04B 10/29* (2013.01)
USPC ........................................................ 398/175

(58) Field of Classification Search
USPC ........................................................ 398/175
See application file for complete search history.

(56) References Cited

U.S. PATENT DOCUMENTS 6,137,605 A  10/2000  Watanabe
7,853,154 B2 * 12/2010 Ikram et al. .................... 398/192

FOREIGN PATENT DOCUMENTS

JP  2008-078749  4/2008

OTHER PUBLICATIONS

"Gigabit-capable Passive Optical Networks (GPON): Reach extension (ex G.984.re—GPON optical reach extension)" *Series G: Transmission Systems and Media, Digital Systems and Networks*: Digital sections and digital litre system—Optical line systems for local and access networks, ITU-T Telecommunication Standardization Sector of ITU G.984,6, Mar. 2008, pp. 1-37.

* cited by examiner

*Primary Examiner* — Shi K Li
(74) *Attorney, Agent, or Firm* — Blakely, Sokoloff, Taylor & Zafman

(57) ABSTRACT

A burst mode optical repeater is provided. The burst mode optical repeater receives optical signals, which are transmitted from a plurality of optical network units (ONUs) in a passive optical network (PON) to a central office using a time division multiplexing access (TDMA) method, and relays the received optical signals using an optical-electrical-optical (OEO) method. Since the burst mode optical repeater can be installed anywhere between an optical line terminal (OLT) and the ONUs, the number of subscribers and transmission range that can be supported by a corresponding network can be increased.

14 Claims, 6 Drawing Sheets

BURST MODE OPTICAL REPEATER

CROSS-REFERENCE TO RELATED APPLICATION

This application claims the benefit under 35 U.S.C. §119(a) of Korean Patent Application No. 10-2008-0120120, filed on Nov. 28, 2008, the disclosure of which is incorporated herein in its entirety by reference.

BACKGROUND

1. Field

The following description relates to an optical repeater which has an increased transmission range, and more particularly, to a burst mode optical repeater.

2. Description of the Related Art

Recently, there has been increasing demand for an optical network that can transmit tens to hundreds of megabytes of multimedia content per second to subscribers at a low cost. One possible solution to meet this demand is a time division multiplexing access-passive optical network (TDMA-PON). A TDMA-PON can provide an ultra high-speed multimedia service to each optical network unit (ONU) by using an optic fiber.

A TDMA-PON consists of an optical line terminal (OLT) installed at a central office (CO) and a plurality of ONUs connected to the OLT by an optical fiber through a 1:N optical distribution node (ODN) interposed between the OLT and the ONUs. A TDMA-PON can provide a high-capacity multimedia service efficiently and inexpensively.

FIG. 1 is a block diagram illustrating a conventional time division multiplexing access-passive optical network (TDMA-PON). Referring to FIG. 1, the conventional TDNA-PON consists of an OLT which is located at a central office, a plurality of splitters which split downstream optical signals and multiplex upstream optical signals, and a plurality of ONUs which are connected to the splitters in a tree structure. In the drawing, the splitters, which are remote nodes (RNs), function as ODNs.

An optical line between the OLT and an RN is called a feeder fiber, and an optical line between an RN and an ONU is called a subscriber line.

Downstream optical signals generated by the OLT at the central office are distributed by the splitters and received by the ONUs. On the other hand, upstream optical signals generated by the ONUs are time-division multiplexed by the splitters and transmitted accordingly to the to OLT.

Here, an upstream optical signal transmitted from an ONU must not collide with an upstream optical signal transmitted from another ONU in the feeder fiber connected to the OLT.

To this end, each ONU must transmit an upstream optical signal in a time slot allocated by the OLT. In general, a continuous optical transmission generates some optical noise even is when there is no data signal. Such optical noise, which is contained in upstream optical signals transmitted from each ONU, interferes in the feeder fiber. As a result, the OLT cannot receive the upstream optical signals properly.

Therefore, each ONU must completely stop outputting an optical signal in time slots other than a time slot allocated itself in order not to generate optical noise. This transmission method is called a burst mode transmission method.

An optical repeater is located on an optical line between the OLT and the ONUs and is used to allow the transmission range between the OLT and the ONUs, and/or the number of subscribers that can be supported by a corresponding network, to be increased. That is, an optical repeater amplifies or relays upstream and downstream optical signals attenuated by transmission loss or splitter loss, thereby increasing transmission range or the number of subscribers.

Recently, the International Telecommunication Union-Telecommunication Standardization Sector (ITU-T) standardized optical repeaters by publishing G.984.6 "Gigabit-capable Passive Optical Networks (GPON): Reach Extension (ex G.984.re-GPON Optical Reach Extension)" in order to extend transmission range of a GPON.

Optical repeaters proposed in the above standard include an upstream/downstream optical repeater using an optical amplifier and an optical-electrical-optical (OEO) repeater. The proposed optical repeaters, however, are installed only between an OLT and splitters, and fail to consider the burst mode transmission method.

An optical repeater must be installed not only between an OLT and splitters but also between the splitters and ONUs.

For this reason, the present inventor has researched an optical repeater that can be installed anywhere between an OLT and ONUs in a PON, and that can receive optical signals, is which are transmitted from the ONUs to a central office using a TDMA method, and then relay the received optical signals using an optical-electrical-optical (OEO) method.

SUMMARY

Accordingly, in one aspect, there is provided a burst mode optical repeater which can be installed anywhere between an optical line terminal (OLT) and optical network units (ONUs) in a passive optical network (PON) and which can receive optical signals, which are transmitted from the ONUs to a central office using a time division multiplexing access (TDMA) method, and relay the received optical signals using an optical-electrical-optical (OEO) method.

In one general aspect, there is provided a burst mode optical repeater which generates a burst enable signal based on a strength of an optical signal received by an optical reception unit and controls an optical signal transmitted from an optical transmission unit to have burst characteristics by using the burst enable signal.

The burst mode optical repeater receives optical signals, which are transmitted from a plurality of ONUs in a PON to a central office using the TDMA method, and relays the received optical signals using the OEO method. Since the burst mode optical repeater can be installed anywhere between an OLT and the ONUs, the number of subscribers and transmission range of a corresponding network can be increased.

Other objects, features and advantages will be apparent from the following description, the drawings, and the claims.

DETAILED DESCRIPTION

The invention is described more fully hereinafter with reference to the accompanying drawings, in which exemplary embodiments of the invention are shown. Descriptions of well-known functions and constructions are omitted to increase clarity and conciseness. Also, the terms used in the following description are terms defined taking into consideration the functions obtained in accordance with the present invention, and may be changed in accordance with the option of a user or operator or a usual practice. Therefore, the definitions of these terms should be determined based on the entire content of this specification.

A burst mode optical repeater can be installed anywhere between an optical line terminal (OLT) and a plurality of optical network units (ONUs) to increase the number of subscribers and transmission range that can be supported by a corresponding network. The burst mode optical repeater controls optical signals transmitted upstream to have burst characteristics.

Figure 1:
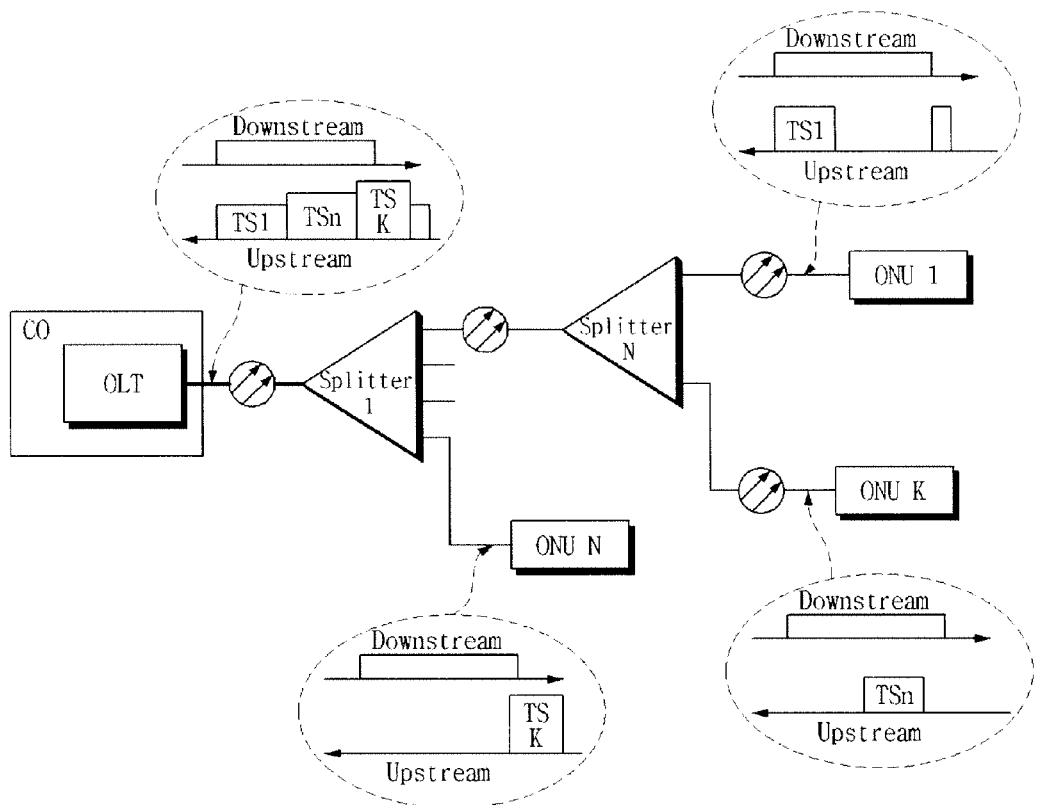
FIG. 1 is a block diagram illustrating a conventional time division multiplexing access-passive optical network (TDMA-PON)
Figure 2:
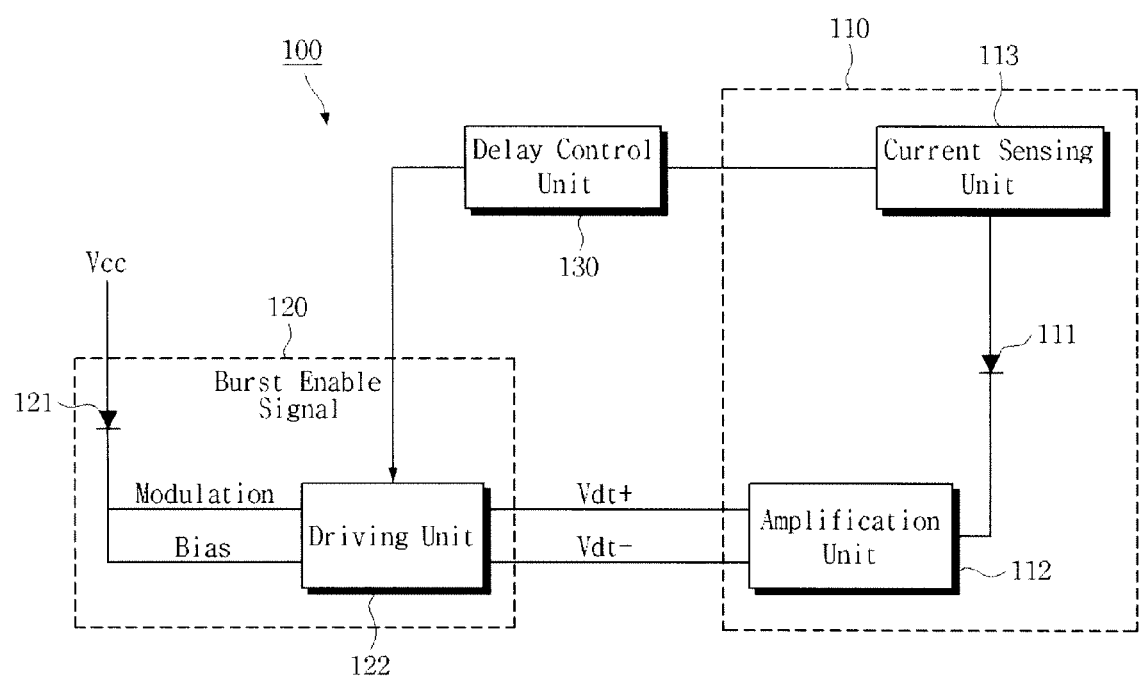
FIG. 2 is a block diagram illustrating an exemplary burst mode optical repeater.

FIG. 2 is a block diagram illustrating an exemplary burst mode optical repeater 100. The burst mode optical repeater 100 includes an optical reception unit 110, an optical transmission unit 120, and a delay control unit 130.

The optical reception unit 110 receives an attenuated optical signal transmitted upstream from each of a plurality of ONUs. When an optical signal transmits upstream from each of the ONUs, transmission loss due to optical transmission lines and splitters (not shown) occurs.

In addition, the optical signal transmitted from each of the ONUs is time-division multiplexed by the splitters. Thus, the time-division multiplexed optical signal, which has burst characteristics and has been attenuated by transmission loss, is input to the optical reception unit 110.

The optical transmission unit 120 transmits an optical signal received by the optical reception unit 110 to an OLT. When the optical reception unit 110 amplifies an attenuated optical signal to send it to the OLT over a long distance, the optical transmission unit 120 transmits the amplified optical signal to the OLT.

The delay control unit 130 generates a burst enable signal based on the strength of an optical signal received by the optical reception unit 110 and controls an optical signal, which is transmitted from the optical transmission unit 120, to have the burst characteristics using the burst enable signal.

The ONUs transmit upstream optical signals in their respective time slots allocated by the OLT. When the upstream optical signals are multiplexed by the splitters, noise contained in the upstream optical signals may interfere each other. To prevent this problem, each of the upstream optical signals must be controlled to have the burst characteristics so that it is not output in time slots other than a time slot allocated to a corresponding one of the ONUs in order to not generate optical noise.

A time-division multiplexed optical signal input to the optical reception unit 110 has the to burst characteristics. That is, an optical signal output from the optical transmission unit 120 can be controlled to have the burst characteristics. In detail, a time-division multiplexed optical signal having the burst characteristics changes current that flows through the optical reception unit 110. Accordingly, the delay control unit 130 generates the burst enable signal based on the changed current and controls an optical signal output from the optical transmission unit 120 to have the burst characteristics by using the burst enable signal.

As described above, the burst mode optical repeater 100 receives optical signals, which are transmitted from a plurality of ONUs in a passive optical network (PON) to a central office using a time division multiplexing access (TDMA) method, and relays the received optical signals using an optical-electrical-optical (OEO) method. In addition, the burst mode optical repeater 100 can be installed anywhere between an OLT and the ONUs. The delay control unit 130 included in the burst mode optical repeater 100 generates the burst enable signal based on the strength of an optical signal received by the optical reception unit 110 and controls an optical signal, which is transmitted from the optical transmission unit 120, to have the burst characteristics. Consequently, the burst mode optical repeater 100 can increase the number of subscribers and transmission range that can be supported by a corresponding network.

According to an additional aspect of the present invention, the optical reception unit 110 may convert an optical signal that is received into an electrical signal and output the electrical signal to the optical transmission unit 120. In addition, the optical reception unit 110 may measure the strength of the received optical signal and output the measured strength to the delay control unit 130. To this end, the optical reception unit 110 may include an optical detection unit 111, an amplification unit 112, and a current sensing unit 113.

The optical detection unit 111 detects an attenuated optical signal, which is transmitted upstream using the TDMA method, and outputs the detected optical signal as an electric current component. The optical detection unit 111 may be a photodiode (PD) that can detect an to attenuated upstream optical signal and output the detected optical signal as an electric current component.

The amplification unit 112 amplifies an electrical signal, which is represented as an electric current component output from the optical detection unit 111, to a predetermined voltage level and outputs the amplified electrical signal. The amplification unit 112 may be a transimpedence amplifier or a limiting amplifier that can amplify a data signal, which is represented as an electric current component output from the photodiode (i.e., the optical detection unit 111), into a predetermined voltage level Vdt+ or Vdt− and output the amplified signal.

The current sensing unit 113 senses the current of an optical signal detected by the optical detection unit 111. The current sensing unit 113 senses a current signal that flows through the optical detection unit 111 when an optical signal is input to the optical reception unit 110. An optical signal having the burst characteristics changes current that flows through the photodiode (i.e., the optical detection unit 111). Accordingly, the current sensing unit 113 senses an optical signal on a burst packet-by-burst packet basis and sends the sensing result to the delay control unit 130. Then, the delay control unit 130 generates the burst enable signal and transmits the generated burst enable signal to the optical transmission unit 120, so that an optical signal transmitted from the optical transmission unit 120 has the burst characteristics.

The current detection unit 113 may sense whether a signal is an analog or digital current signal at an input or output terminal of the optical reception unit 110 or a front or rear end of the amplification unit 112.

According to an additional aspect of the present invention, the optical transmission unit 120 may convert an electrical signal output from the optical reception unit 110 into an optical signal and transmit the optical signal. However, the optical transmission unit 120 may stop transmitting an optical signal in a time domain, in which no electrical signal is present, in response to the burst enable signal output from the delay control unit 130 so that the optical signal can have the burst characteristics. To this end, the optical transmission unit 120 may include an optical output unit 121 and a driving unit 122.

The optical output unit 121 outputs an optical signal upstream. The optical output unit 121 may be a laser diode (LD) that can output an optical signal based on an electric current component output from the optical reception unit 110.

The driving unit 122 generates a bias current and a modulation current, which drive the optical output unit 121, in response to an electrical signal (i.e., an electric current component) received from the optical reception unit 110 and the burst enable signal received from the delay control unit 130.

In response to the burst enable signal, the driving unit 122 may control the optical output unit 121 to stop outputting an optical signal in order to prevent generation of optical noise between optical packets of the optical output unit 121. Thus, an optical signal transmitted upstream from the optical output unit 121 can have the burst characteristics.

For example, the driving unit 122 may control the optical output unit 121 to stop outputting an optical signal by cutting the supply of the bias current and the modulation current to the optical output unit 121.

Figure 3:
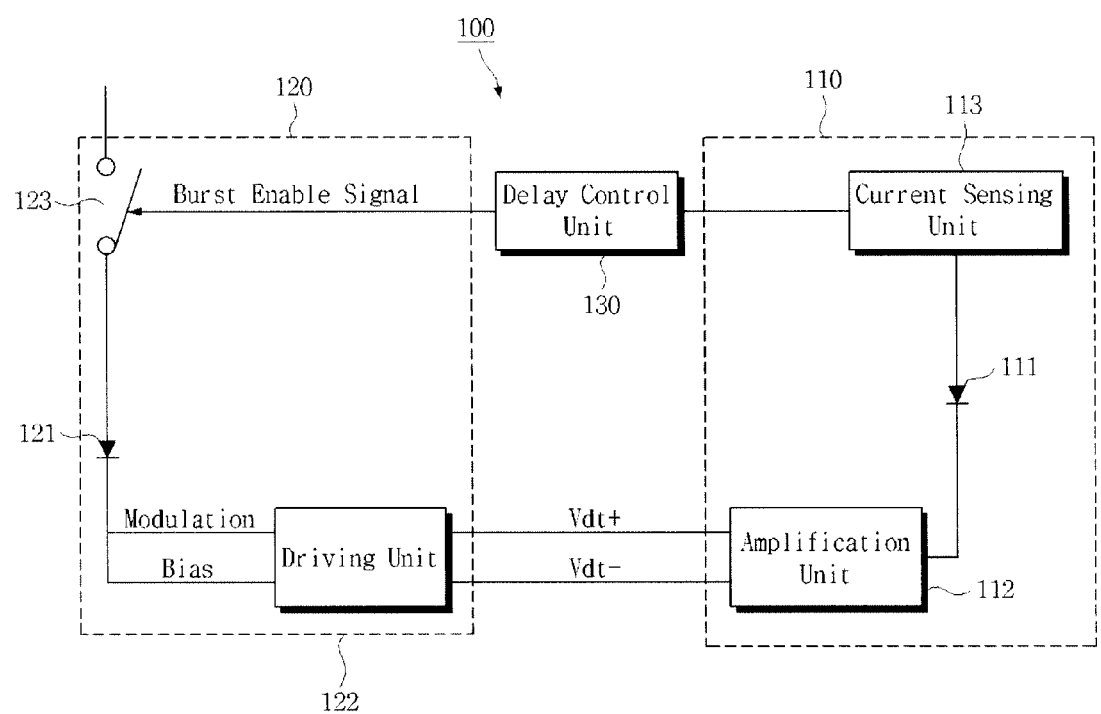
FIG. 3 is a block diagram illustrating an optical transmission unit of another exemplary burst mode optical repeater.

FIG. 3 is a block diagram illustrating an optical transmission unit 120 of another exemplary burst mode optical repeater 100. Referring to FIG. 3, the optical transmission unit 120 includes an optical output unit 121, a driving unit 122, and a switch unit 123.

The optical output unit 121 outputs an optical signal upstream. The optical output unit 121 may be a laser diode that can output an optical signal based on an electric current component output from an optical reception unit 110.

The driving unit 122 generates a bias current and a modulation current, which drive the optical output unit 121, in response to an electrical signal received from the optical reception unit 110.

The switch unit 123 prevents the optical output unit 121 from outputting an optical signal in response to the burst enable signal received from a delay control unit 130.

That is, in the previous exemplary embodiment, the optical output unit 121 is controlled by the bias current and the modulation current. However, in the current exemplary embodiment, the optical output unit 121 is controlled by the switch unit 123 which is switched on or off in response to the burst enable signal received from the delay control unit 130 to allow or cut the supply of power Vcc to the optical output unit 121.

According to an additional aspect of the present invention, the delay control unit 130 may generate the burst enable signal by comparing a voltage due to a current detected by a current sensing unit 113 with a preset reference voltage.

Figure 4:
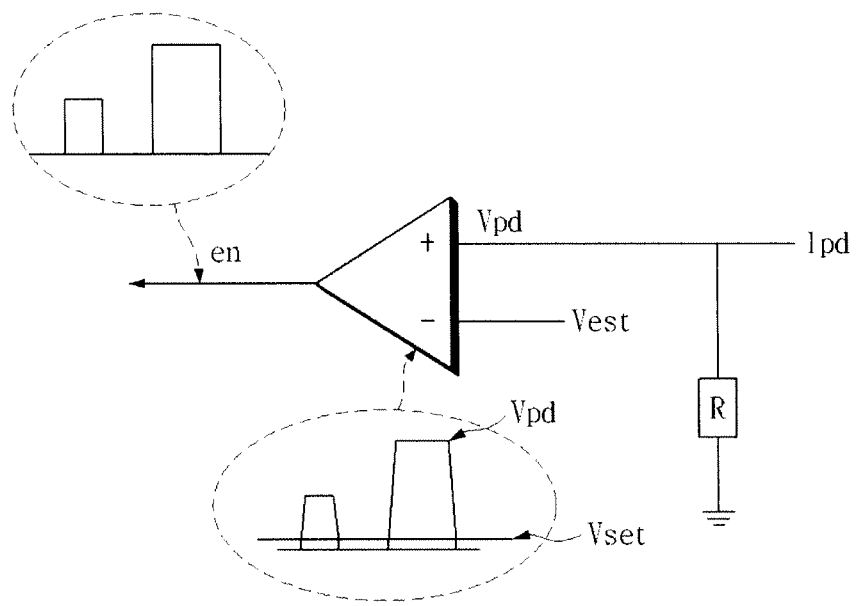
FIG. 4 is a block diagram illustrating an exemplary delay control unit included in the burst mode optical repeater of FIG. 2 or 3.

FIG. 4 is a block diagram illustrating an exemplary delay control unit 130 included in the burst mode optical repeater 100 of FIG. 2 or 3. Referring to FIG. 4, a current Ipd of an optical signal received by the optical reception unit 110 may be represented by its strength (i.e. how high or low the strength is) for each packet. Thus, the current sensing unit 113 may detect the current Ipd, and the delay control unit 130 may generate a burst enable signal en by comparing the voltage due to the current Ipd detected by the current sensing unit 113 with a preset reference voltage Vset using an operational amplifier.

Meanwhile, the delay control unit 130 may control the time required by the optical reception unit 110 to convert an optical signal into an electrical signal. That is, the delay control unit 130 may compensate for the difference between the time required by the optical reception unit 110 to convert an optical signal into an electrical signal and the time required by the delay control unit 130 to convert a detected current signal into the burst enable signal en. Here, the difference depends on the time required to be compensated for by the optical reception unit 110.

Figure 5:
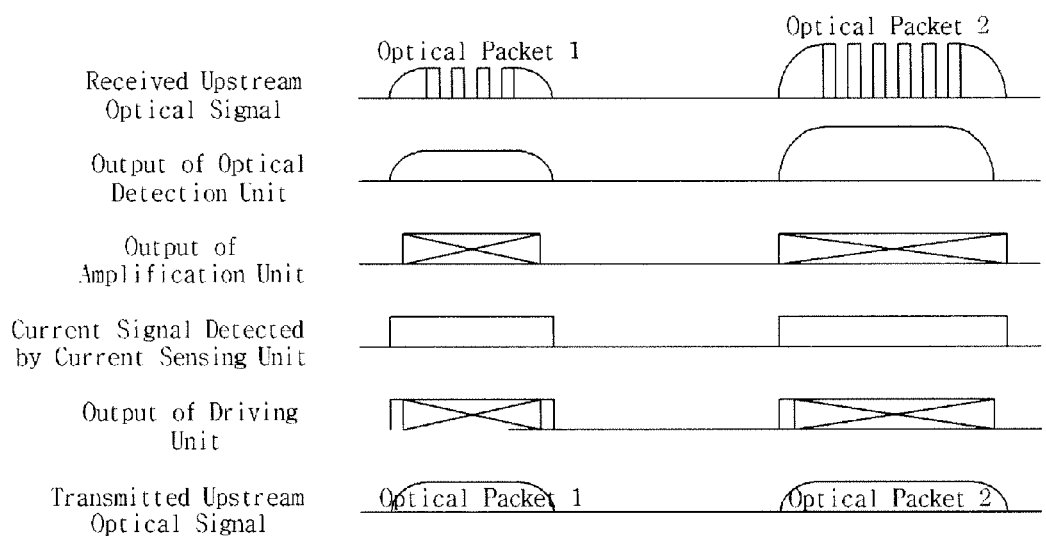
FIG. 5 is a signal-timing diagram illustrating the burst mode optical repeater of FIG. 2 or 3.

FIG. 5 is a signal-timing diagram illustrating the burst mode optical repeater 100 of FIG. 2 or 3. Optical signals transmitted upstream from ONUs have different strengths and burst characteristics according to physical locations of the ONUs. This is due to transmission loss is caused by optical lines and splitters. However, the burst mode optical repeater 100 according to the present invention enables optical signals to have uniform strengths and burst characteristics.

Figure 6:
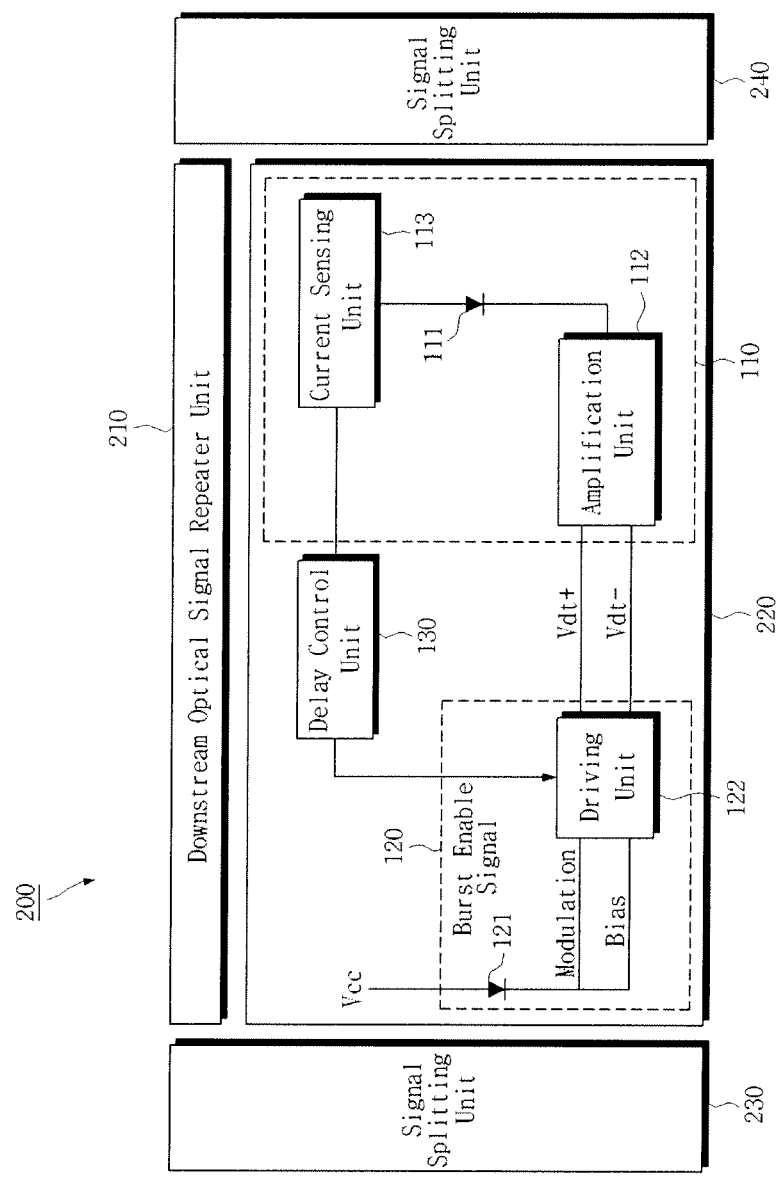
FIG. 6 is a block diagram illustrating another exemplary burst mode optical repeater.

FIG. 6 is a block diagram illustrating another exemplary burst mode optical repeater 200. The burst mode optical repeater 200 is used in a bi-directional transmission system that can simultaneously transmit upstream and downstream optical signals having different wavelengths by using a single optic fiber.

The burst mode optical repeater 200 includes a downstream optical signal repeater unit 210, an upstream optical signal repeater unit 220, and signal splitting units 230 and 240. The downstream optical signal repeater unit 210 relays an attenuated optical signal transmitted downstream by receiving the attenuated optical signal, amplifying the received optical signal, and outputting the amplified signal.

The upstream optical signal repeater unit 220 relays an attenuated optical signal transmitted upstream by receiving the attenuated optical signal, amplifying the received optical signal, and outputting the amplified signal. The upstream optical signal repeater unit 220 controls the optical signal transmitted upstream to have the burst characteristics.

The upstream optical signal repeater 220 includes an optical reception unit 110, an optical transmission unit 120, and a delay control unit 130.

The optical reception unit 110 receives an attenuated optical signal transmitted upstream from each of a plurality of ONUs. When an optical signal transmits upstream from each of the ONUs, transmission loss due to optical transmission lines and splitters (not shown) occurs.

In addition, the optical signal transmitted from each of the ONUs is time-division multiplexed by the splitters. Thus, the time-division multiplexed optical signal, which has burst characteristics and has been attenuated by transmission loss, is input to the optical reception unit 110.

The optical transmission unit 120 transmits an optical signal received by the optical reception unit 110 to an OLT. When the optical reception unit 110 amplifies an attenuated optical signal to send it to the OLT over a long distance, the optical transmission unit 120 transmits the amplified optical signal to the OLT.

The delay control unit 130 generates the burst enable signal based on the strength of an optical signal received by the optical reception unit 110 and controls an optical signal, which is transmitted from the optical transmission unit 120, to have the burst characteristics using the burst enable signal.

The ONUs transmit upstream optical signals in their respective time slots allocated by the OLT. When the upstream optical signals are multiplexed by the splitters, noise contained in the upstream optical signals may interfere. To prevent this problem, each of the upstream optical signals must be controlled to have the burst characteristics so that it is not output in time slots other than a time slot allocated to a corresponding one of the ONUs in order not to generate optical noise.

A time-division multiplexed optical signal input to the optical reception unit 110 has the burst characteristics. That is, an optical signal output from the optical transmission unit 120 can be controlled to have the burst characteristics. In detail, a time-division multiplexed optical signal having the burst characteristics changes current that flows through the optical reception unit 110. Accordingly, the delay control unit 130 generates the burst enable signal based on the changed current and controls an optical signal output from the optical transmission unit 120 to have the burst characteristics by using the burst enable signal.

As described above, the burst mode optical repeater 200 can be installed anywhere between an OLT and a plurality of ONUs. Accordingly, the burst mode optical repeater 200 receives optical signals, which are transmitted from the ONUs in a PON to a central office using the TDMA method, and relays the received optical signals using the OEO method. The delay control unit 130 included in the burst mode optical repeater 200 generates the burst enable signal based on the strength of an optical signal received by the optical reception unit 110 and controls an optical signal, which is transmitted upstream from the optical transmission unit 120, to have the burst characteristics.

The specific configuration and operation of the upstream optical signal repeater unit 220 are identical to those of the optical signal repeater 100 illustrated in FIGS. 2 and 3. Thus, a description of elements substantially identical to those of the previous embodiments described above will be omitted.

The signal splitting units 230 and 240 are installed at both ends of the burst mode optical repeater 200, respectively. The signal splitting units 230 and 240 split an upstream optical signal and a downstream optical signal so that the upstream optical signal and the downstream optical signal can pass through the upstream optical signal repeater unit 220 and the downstream optical signal repeater unit 210, respectively.

The burst mode optical repeater 200 structured as described above can control an upstream optical signal to have the burst characteristics in a bi-directional transmission system that can simultaneously transmit upstream and downstream optical signals having different wavelengths by using a single optic fiber.

As apparent from the above description, a burst mode optical repeater according to the present invention receives upstream optical signals, which are transmitted from a plurality of ONUs in a PON to a central office using the TDMA method, and relays the received optical signals using the OEO method. Since the burst mode optical repeater can be installed anywhere between an OLT and the ONUs, the number of subscribers and transmission range that can be supported by a corresponding network can be increased, thereby accomplishing the objectives of the present invention.

The present invention can be industrially used in the fields of optical repeater technology and its applied technologies.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A burst mode optical repeater comprising:
    an optical reception unit receiving an attenuated optical signal which is transmitted upstream from an optical network unit;
    an optical transmission unit transmitting the optical signal, which is received by the optical reception unit, to an optical line terminal; and
    a delay control unit generating a burst enable signal based on a strength of the optical signal received by the optical reception unit and controlling an optical signal, which is transmitted from the optical transmission unit, to have burst characteristics by using the burst enable signal,
    wherein the optical reception unit converts the received optical signal into an electrical signal and outputs the electrical signal to the optical transmission unit, and measures the strength of the received optical signal and outputs the measured strength to the delay control unit,
    wherein the optical reception unit comprises an optical detection unit detecting an attenuated optical signal, which is transmitted upstream using a time division multiplexing access (TDMA) method, and outputting the detected optical signal as an electric current component, an amplplification unit amplifying an electrical signal which is represented as the electric current component output from the optical detection unit, to a predetermined voltage level and outputting the amplified electrical signal and a current sensing unit sensing a current of the optical signal detected by the optical detection unit.

2. The optical repeater of claim 1, wherein the optical transmission unit converts the electrical signal output from the optical reception unit into an optical signal and transmits the optical signal, wherein the optical transmission unit stops transmitting the optical signal in a time domain, in which no electrical signal is present, in response to the burst enable signal received from the delay control unit, so that the optical signal has the burst characteristics.

3. The optical repeater of claim 2, wherein the optical transmission unit comprises:
    an optical output unit outputting an optical signal upstream; and
    a driving unit generating a bias current and a modulation current, which drive the optical output unit, based on the electrical signal received from the optical reception unit and the burst enable signal received from the delay control unit.

4. The optical repeater of claim 3, wherein, in response to the burst enable signal, the driving unit controls the optical output unit to stop outputting an optical signal in order to prevent generation of optical noise between optical packets of the optical output unit.

5. The optical repeater of claim 4, wherein the driving unit controls the optical output unit to stop outputting an optical signal by cutting supply of the bias current and the modulation current to the optical output unit.

6. The optical repeater of claim 2, wherein the optical transmission unit comprises:
    an optical output unit outputting an optical signal upstream;
    a driving unit generating a bias current and a modulation current, which drive the optical output unit, based on the electrical signal received from the optical reception unit; and
    a switch unit controlling the optical output unit to stop outputting an optical signal in response to the burst enable signal received from the delay control unit.

7. The optical repeater of claim 1, wherein the delay control unit generates the burst enable signal by comparing a voltage due to the current detected by the current detection unit with a preset reference voltage.

8. A burst mode optical repeater comprising:
    a downstream optical signal repeater unit relaying an attenuated optical signal transmitted downstream by receiving the attenuated optical signal, amplifying the received optical signal, and outputting the amplified signal;

an upstream optical signal repeater unit comprising an optical reception unit which receives an attenuated optical signal transmitted upstream from an optical network unit, an optical transmission unit which transmits the optical signal received by the optical reception unit to an optical line terminal, and a delay control unit which generates a burst enable signal based on a strength of the optical signal received by the optical reception unit and controls an optical signal, which is transmitted from the optical transmission unit, to have burst characteristics by using the burst enable signal; and signal splitting units which are installed at both ends of the burst mode optical repeater and split the optical signal transmitted downstream and the optical signal transmitted upstream so that the optical signal transmitted downstream and the optical signal transmitted upstream respectively pass through the downstream optical signal repeater unit and the upstream optical repeater unit, wherein the optical reception unit converts the received optical signal into an electrical signal and outputs the electrical signal to the optical transmission unit, and measures the strength of the received optical signal and outputs the measured strength to the delay control unit, wherein the optical reception unit comprises an optical detection unit detecting an attenuated optical signal, which is transmitted upstream using a TDMA (tine division multiplexing access) method, and outputting the detected optical signal as an electric current component, an amplification unit amplifying an electrical signal, which is represented as the electric current component output from the optical detection unit, to a predetermined voltage level and outputting the amplified electrical signal and a current sensing unit sensing a current of the optical signal detected by the optical detection unit.

9. The optical repeater of claim 8, wherein the optical transmission unit converts the electrical signal output from the optical reception unit into an optical signal and transmits the optical signal, wherein the optical transmission unit stops transmitting the optical signal in a time domain, in which no electrical signal is present, in response to the burst enable signal received from the delay control unit, so that the optical signal has the burst characteristics.

10. The optical repeater of claim 9, wherein the optical transmission unit comprises:
   an optical output unit outputting an optical signal upstream; and
   a driving unit generating a bias current and a modulation current, which drive the optical output unit, based on the electrical signal received from the optical reception unit and the burst enable signal received from the delay control unit.

11. The optical repeater of claim 10, wherein, in response to the burst enable signal, the driving unit controls the optical output unit to stop outputting an optical signal in order to prevent generation of optical noise between optical packets of the optical output unit.

12. The optical repeater of claim 11, wherein the driving unit controls the optical output unit to stop outputting an optical signal by cutting supply of the bias current and the modulation current to the optical output unit.

13. The optical repeater of claim 9, wherein the optical transmission unit comprises:
   an optical output unit outputting an optical signal upstream;
   a driving unit generating a bias current and a modulation current, which drive the optical output unit, based on the electrical signal received from the optical reception unit; and
   a switch unit controlling the optical output unit to stop outputting an optical signal in response to the burst enable signal received from the delay control unit.

14. The optical repeater of claim 8, wherein the delay control unit generates the burst enable signal by comparing a voltage due to the current detected by the current detection unit with a preset reference voltage.

* * * * *